US012151882B2

(12) United States Patent
Li

(10) Patent No.: US 12,151,882 B2
(45) Date of Patent: Nov. 26, 2024

(54) LONG TUBE PLASTIC FILM BAG FOR GARBAGE CAN AND PACKAGING METHOD THEREOF AND PACKAGING MOLD

(71) Applicant: AIRDEER (HANGZHOU) TECHNOLOGY CO., LTD., Zhejiang (CN)

(72) Inventor: Jun Li, Zhejiang (CN)

(73) Assignee: AIRDEER (HANGZHOU) TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/576,362

(22) PCT Filed: Oct. 9, 2022

(86) PCT No.: PCT/CN2022/124117
§ 371 (c)(1),
(2) Date: Jan. 4, 2024

(87) PCT Pub. No.: WO2023/016581
PCT Pub. Date: Feb. 16, 2023

(65) Prior Publication Data
US 2024/0327111 A1 Oct. 3, 2024

(30) Foreign Application Priority Data
Aug. 10, 2021 (CN) ......................... 202110913894.3

(51) Int. Cl.
*B65F 1/06* (2006.01)
*B65F 1/00* (2006.01)

(52) U.S. Cl.
CPC ............ *B65F 1/0006* (2013.01); *B65F 1/062* (2013.01)

(58) Field of Classification Search
CPC B65F 1/0006; B65F 1/0652; B65F 2240/132; B65D 33/002; B65D 35/24
(Continued)

(56) References Cited

U.S. PATENT DOCUMENTS 5,671,847 A * 9/1997 Pedersen ............ B65D 75/5833 206/390
6,260,698 B1 * 7/2001 Delost .................... B65D 77/02 206/410
2017/0233182 A1 * 8/2017 Chakravarthy ......... B65F 1/163 220/495.06

FOREIGN PATENT DOCUMENTS

CN 103010634 4/2013
CN 104528449 4/2015
(Continued)

OTHER PUBLICATIONS

"International Search Report (Form PCT/ISA/210) of PCT/CN2022/124117", mailed on Jan. 3, 2023, with English translation thereof, pp. 1-5.

*Primary Examiner* — Stephen F. Gerrity
*Assistant Examiner* — Linda J Hodge
(74) *Attorney, Agent, or Firm* — JCIPRNET

(57) ABSTRACT

A long tube plastic film bag for garbage cans and a packaging method thereof, and a packaging mold are provided. The long tube plastic film bag includes a long tube plastic film bag body and an outer packaging. The outer packaging is a film tube material. The film tube material includes a first opening and a second opening. One annular first groove is formed between the first opening and the second opening. An end of the long tube plastic film bag body is an open end, and another end is a sealed end. The long tube plastic film bag body is gathered toward the open end and stored in the
(Continued)

first groove. The sealed end of the long tube plastic film bag body is extended out of the first groove of the film tube material.

10 Claims, 8 Drawing Sheets

(58) Field of Classification Search
USPC ................. 53/204, 409, 452, 453, 567, 576; 206/303, 554; 383/37; 220/495.06, 220/495.07, 495.08, 495.1, 495.11, 908, 220/908.1, 908.3
See application file for complete search history.

(56) References Cited

FOREIGN PATENT DOCUMENTS

| | | | | |
|---|---|---|---|---|
| CN | 207346349 | | 5/2018 | |
| CN | 208249043 | | 12/2018 | |
| CN | 208453666 | | 2/2019 | |
| CN | 209258851 | * | 8/2019 | .............. B65F 1/062 |
| CN | 210012171 | | 2/2020 | |
| CN | 210213567 | | 3/2020 | |
| CN | 113443297 | | 9/2021 | |
| EP | 3575242 A1 | * | 12/2019 | .............. B65F 1/062 |
| JP | 2000025782 | | 1/2000 | |

* cited by examiner

LONG TUBE PLASTIC FILM BAG FOR GARBAGE CAN AND PACKAGING METHOD THEREOF AND PACKAGING MOLD

CROSS-REFERENCE TO RELATED APPLICATION

This application is a 371 of international application of PCT application serial No. PCT/CN2022/124117, filed on Oct. 9, 2022, which claims the priority benefit of China application no. 202110913894.3, filed on Aug. 10, 2021. The entirety of each of the above-mentioned patent applications is hereby incorporated by reference herein and made a part of this specification.

BACKGROUND OF THE INVENTION

Field of the Invention

The invention relates to the field of plastic film bag packaging, and in particular to a long tube plastic film bag for garbage cans and a packaging method thereof, and a packaging mold.

Description of Related Art

Taking out the garbage is a relatively frequent action in people's lives. Some frequently repeated actions in the process of using the garbage can, such as packaging and changing bags, seem cumbersome and annoying to modern people living a fast-paced life. Therefore, there are many automatic garbage cans on the market that may automatically pack and seal, and automatically change bags.

Since the long tube plastic film bag of annular packaging has its own opening, it is convenient to implement automatic bag feeding and the long tube plastic film bag is used in automatic garbage cans for automatic packaging and sealing of plastic film bags and automatic bag changing. This type of automatic garbage can usually contain a garbage bag storage device, with a flip cover at the upper portion of the garbage bag storage device, a garbage bag sealing device at the lower portion of the garbage bag storage device, and a barrel body below the sealing device.

The more common long tube plastic film bags on the market usually involve packaging an annular long tube plastic film bag in one annular plastic box. When used, the annular plastic box may simply be put into the garbage bag storage bin of the automatic garbage can. Generally, long tube plastic film bags of several meters to more than ten meters may be squeezed and placed in this annular plastic box. For example, authorization announcement numbers CN 208453666 U and CN 210012171 U both implement the function of providing garbage bags for the garbage can by mounting a garbage bag box on the storage rack and placing the garbage bag in the garbage box. However, in this long tube plastic film bag packaging method, in order to have sufficient rigidity, the wall thickness of the annular plastic box is greater, and the plastic used in the box is heavier, usually heavier than the total weight of the plastic film bags contained therein, and, considering the cost of recycling, this annular plastic box is usually single-use. After the plastic film bag in the annular plastic box is used up, the annular plastic box is thrown away. Therefore, the disadvantages thereof are:

1. high production cost and huge waste;
2. plastic packaging boxes are single-use and cause significant environmental pollution. The plastic weight of the box may reach 150% of the weight of the plastic bag therein, and the packaging design is unreasonable;
3. rigid packaging boxes may not be compressed, are large in size, and have high logistics costs;
4. under the same capacity of the garbage bag storage compartment, since the box takes up more space, the number of garbage bags that may be loaded at one time is reduced, and users have to replace the bags more frequently.

SUMMARY OF THE INVENTION

Technical Problems

In order to solve the above technical issues, one of the objects of the invention is to provide a long tube plastic film bag. The plastic film bag has simple packaging and low raw material cost; is compressible, takes up little space and reduces logistics costs; moreover, the effective storage capacity of the long tube plastic film bag body may be increased, and more long tube plastic film bag bodies may be held at one time, reducing the frequency of replacing long tube plastic film bags, thus improving user experience; the second object is to provide a packaging method for the long tube plastic film bag; the third object is to provide a packaging mold used in the long tube plastic film bag packaging method; and the fourth object is to provide a garbage can that may use the long tube plastic film bag.

Solutions to Problems

Technical Solutions

In order to achieve the above objects, the invention adopts the following technical solutions.

A long tube plastic film bag includes a long tube plastic film bag body and an outer packaging packaged outside the long tube plastic film bag body, the outer packaging is a film tube material, and the film tube material includes a first opening and a second opening, one annular first groove is formed between the first opening and the second opening, an end of the long tube plastic film bag body is an open end, another end of the long tube plastic film bag body is a sealed end, the long tube plastic film bag body is gathered toward the open end and stored in the first groove, the sealed end of the long tube plastic film bag body is extended out of the first groove of the film tube material, and the first opening of the film tube material, the long tube plastic film bag body, and the second opening of the film tube material are fixedly connected via a connecting line.

Preferably, a first easy-tearing line is provided at a side of the first opening the film tube below the connecting line.

Preferably, a second easy-tearing line is provided at a side of the second opening the film tube material below the connecting line.

Preferably, the film tube material is a plastic film tube material or a paper film tube material.

Preferably, the connecting line is formed by hot melting, bonding, or sewing the first opening of the film tube material, the long tube plastic film bag body, and the second opening of the film tube material.

Preferably, the connecting line is in an annular or linear shape.

A packaging method of the long tube plastic film bag having the specific packaging steps as follows:

step 1) taking a piece of the film tube material, opening and fixing the first opening of the film tube material, closing and lifting the second opening of the film tube material, and the second opening is disposed inside or outside the first opening, thereby forming one first groove;

step 2) squeezing the packaged long tube plastic film bag body into the first groove, and leaving an end of the long tube plastic film bag body and making the end of the long tube plastic film bag body higher than the first opening and the second opening of the film tube material;

step 3) connecting the first opening of the film tube material, the long tube plastic film bag body, and the second opening of the film tube material in sequence to form a connecting line, thereby, the first groove of the film barrel is closed to form one annular space, the annular space is packaged with the long tube plastic film bag body inside, and the end of the long tube plastic film bag body is extended out of the annular space;

step 4) gathering and sealing the end of the long tube plastic film bag body to form a sealed end into a first bag bottom of the long tube plastic film bag body.

Preferably, a packaging mold is further used, the packaging mold comprises a base and a mold core, the base is provided with a third annular groove, and a shape and a size of the mold core match a shape and a size of the third groove on the base; the packaging steps using the packaging mold are as follows:

step 1) taking a piece of the film tube material, opening and fixing the first opening of the film tube material via a core mold, closing and lifting the second opening of the film tube material, the second opening is disposed inside or outside the first opening, thereby forming one first groove, and at this time, the core mold is located in the first groove;

step 2) lowering and pressing the core mold into the third groove, sucking the film tube material into the third groove via negative air pressure, the core mold rises and exits the third groove, and a first groove matching the shape and the size of the third groove is formed on the plastic tube film;

step 3) squeezing the long tube plastic film bag body into the first groove, and leaving the end of the long tube plastic film bag body and making the end of the long tube plastic film bag body higher than the first opening and the second opening of the film tube material;

step 4) connecting the first opening of the film tube material, the long tube plastic film bag body, and the second opening of the film tube material in sequence to form a connecting line, thereby, the first groove of the film barrel is closed to form one annular space, the annular space is packaged with the long tube plastic film bag body inside, and the end of the long tube plastic film bag body is extended out of the annular space;

step 5) gathering and sealing the end of the long tube plastic film bag body to form a sealed end into the first bag bottom of the long tube plastic film bag body.

A garbage can includes a barrel body, and further includes a second groove used to accommodate the long tube plastic film bag, wherein the second groove is annular and has an open upper side, an inner sidewall of the second groove is annular and cylindrical and is fixedly connected or integrally formed with the barrel body, an annular cylindrical inner hole is a garbage input port, a bottom wall of the second groove is annular and fixedly connected or integrally formed with the barrel body, an outer sidewall of the second groove is annular and cylindrical and fixedly connected or integrally formed with the barrel body; the long tube plastic film bag is stored in the second groove, and the sealed end of the long tube plastic film bag is exposed outside the second groove and laid from the garbage input port into an inside of the barrel body to form a storage space for storing a garbage.

Preferably, the barrel body is further provided with a cover plate, the cover plate is movably disposed above the second groove and covers an upper opening of the second groove, and a channel is provided between the inner sidewall of the second groove and the cover to facilitate a passage of the long tube plastic film bag.

Beneficial Effects of the Invention

Beneficial Effects

Since the invention adopts the above technical solutions, by using the film tube material as the packaging container of the long tube plastic film bag body, the packaging is simple, the packaging container consumption is small, and the container material cost is low; since the film tube material is soft, it may be flattened and packaged for transportation, taking up little space and reducing logistics costs; moreover, the film tube material takes up little space, and with the same volume of the garbage bag storage device of the garbage can, the effective volume of storing the long tube plastic film bag body is increased. More long tube plastic film bag bodies may be loaded at one time, and the frequency of replacing long tube plastic film bags is reduced, thus improving user experience.

DESCRIPTION OF THE EMBODIMENTS

Best Embodiments of the Invention

Figure 1:
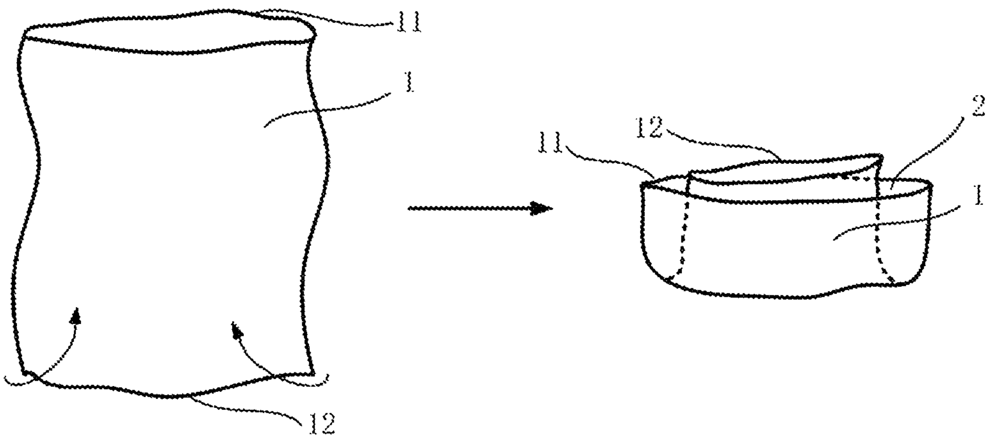
FIG. 1 is a schematic structural diagram of an annular first groove 2 formed in a film tube material 1 in the invention.
Figure 2:
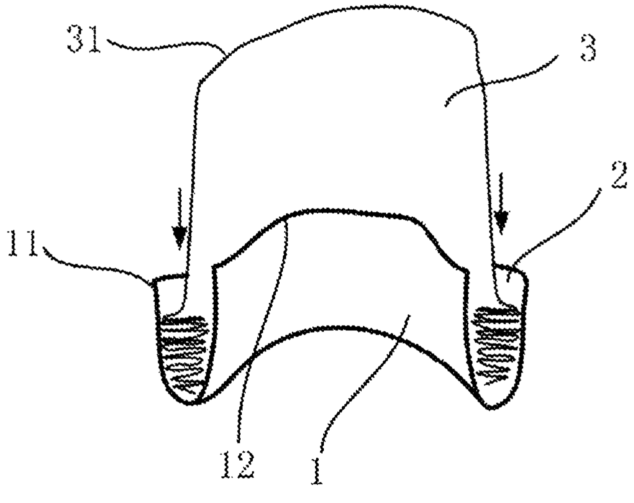
FIG. 2 is a schematic structural diagram of placing a long tube plastic film bag body 3 into the film tube material 1.

Embodiments of the invention are described in detail below, examples of which are illustrated in the accompanying drawings, wherein the same or similar reference numerals throughout represent the same or similar elements or elements having the same or similar functions. The embodiments described below with reference to the drawings are exemplary and are intended to explain the invention and are not to be construed as limiting the invention.

In the description of the invention, it should be understood that, orientation or positional relationship indicated by terms such as "center", "lengthwise", "crosswise", "length", "width", "thickness", "top", "bottom", "front", "back", "left", "right", "vertical", "horizontal", "top", "bottom", "inside", "clockwise", "counterclockwise" etc., based on the orientation or positional relationship shown in the accompanying drawings, merely facilitate the description of the invention and simplify the description and are not intended to indicate or imply that the device or element referred to needs to have a specific orientation or be constructed and operated in a specific orientation, and therefore should not be construed as limitations of the invention.

Moreover, the terms "first" and "second" are used for descriptive purposes only and shall not be understood as indicating or implying relative importance or implicitly indicating the quantity of indicated technical features. Therefore, features defined as "first" and "second" may explicitly or implicitly include one or more of these features. In the description of the invention, unless otherwise stated, the meaning of "plurality" is two or two or more, unless otherwise clearly defined.

In the invention, unless otherwise expressly stipulated and limited, the terms such as "mounting", "connection with each other", "connection", "fixing", should be understood in a broad sense, and for example may be fixed connection, detachable connection, or integral connection; may be mechanical connection or electrical connection; may be direct connection, or may be indirect connection via an intermediary, or may be internal connection between two elements. For those of ordinary skill in the art, the specific meanings of the above terms in the invention may be understood according to specific circumstances.

In the invention, unless otherwise expressly stipulated and limited, a first feature being "above" or "below" a second feature may include the first and second features being in direct contact, and may also include the first and second features not being in direct contact but rather being in contact via another feature between the two. Moreover, the first feature being "higher than", "above", and "over" the second feature includes the first feature being directly above or diagonally above the second feature, or simply means that the horizontal height of the first feature is greater than the second feature. The first feature being "under", "below", and "beneath" the second feature includes the first feature being directly below and diagonally below the second feature, or simply means that the horizontal height of the first feature is less than the second feature.

Embodiment 1

A long tube plastic film bag for a garbage can as shown in FIG. 1 to FIG. 12 includes a long tube plastic film bag body 3 and an outer packaging packaged outside the long tube plastic film bag body 3. In the invention, the outer packaging is a film tube material 1, and the film tube material 1 includes a first opening 11 and a second opening 12, one annular first groove 2 is formed between the first opening 11 and the second opening 12, an end of the long tube plastic film bag body 3 is an open end, another end of the long tube plastic film bag body 3 is a sealed end 32, the long tube plastic film bag body 3 is gathered toward the open end and stored in the first groove 2, the sealed end 32 of the long tube plastic film bag body 3 is extended out of the first groove 2 of the film tube material 1, and the first opening 11 of the film tube material 1, the long tube plastic film bag body 3, and the second opening 12 of the film tube material 1 are fixedly connected via a connecting line 4.

In this way, the long tube plastic film bag in the invention is a soft-packaged, and by using the film tube material 1 as the packaging container of the long tube plastic film bag body 3, the packaging is simple, the packaging container consumption is small, and the container material cost is low; since the film tube material 1 is soft, the film tube material imay be flattened and packaged for transportation, taking up little space and reducing logistics costs; moreover, the film tube material 1 takes up little space, and with the same volume of the garbage bag storage device of the garbage can, the effective volume of storing the long tube plastic film bag body 3 is increased. More long tube plastic film bag bodies 3 may be loaded at one time, and the frequency of replacing long tube plastic film bags is reduced, thus improving user experience. When the film tube material 1 is a paper film tube material, the packaging container has no environmental pollution; when the film tube material 1 is a plastic film tube material, the impact on the environment is also slight due to the small use amount and light weight.

Preferably, the connecting line 4 is formed by hot melting, bonding, or sewing the first opening 11 of the film tube material 1, the long tube plastic film bag body 3, and the second opening 12 of the film tube material 1. The connecting line 4 may be in the shape of a closed loop formed by sequentially connecting the first opening 11 of the film tube material 1, the long tube plastic film bag body 3, and the second opening 12 of the film tube material 1, and may also be in a linear shape formed by sealing and connecting the first opening 11, the second opening 12, and the long tube plastic film bag body 3 of the film tube material 1.

As shown in FIG. 1 to FIG. 4, a packaging method of the long tube plastic film bag specifically includes packaging steps:

step 1) taking a piece of the film tube material 1, opening and fixing the first opening 11 of the film tube material 1, closing and lifting the second opening 12 of the plastic film tube material 1, thereby forming one first groove 2, and the second opening 12 is disposed inside or outside the first opening 11, thereby forming one first groove 2, and the sizes of the first opening 11 and the second opening 12 are different;

step 2) squeezing the packaged long tube plastic film bag body 3 into the first groove 2, and leaving an end 31 of the long tube plastic film bag body 3 and making the end 31 of the long tube plastic film bag body 3 higher than the first opening 11 and the second opening 12 of the film tube material 1;

step 3) connecting the first opening 11 of the film tube material 1, the long tube plastic film bag body 3, and the second opening 12 of the film tube material 1 together in sequence to form the connecting line 4. Thereby, the first groove 2 of the film tube material 1 is closed to form one annular space, the long tube plastic film bag body 3 is packaged inside the annular space, and the end 31 of the long tube plastic film bag body 3 is extended out of the annular space;

step 4) gathering and sealing the end 31 of the long tube plastic film bag body 3 to form the sealed end 32 into the first bag bottom 32 of the long tube plastic film bag body 3, thus completing the packaging of the long tube plastic film bag body 3.

Figure 11:
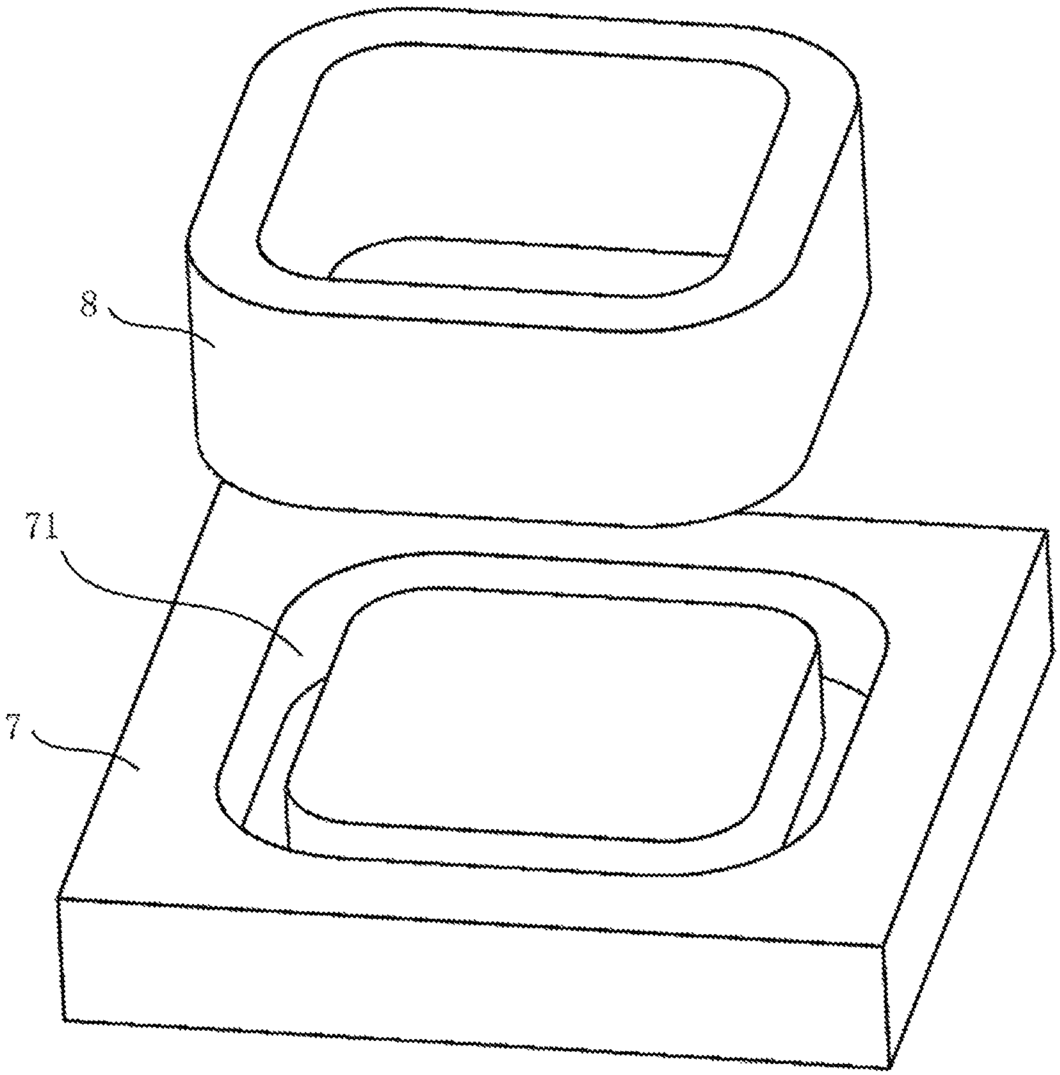
FIG. 11 is a schematic structural diagram of a packaging mold in the invention.

In order to make the packaging of the long tube plastic film bag body 3 more convenient, as shown in FIG. 11, the invention also adopts a packaging mold in the packaging process of the long tube plastic film bag. The packaging mold includes a base 7 and a mold core 8. The base 7 is provided with an annular third groove 71, and the shape and size of the mold core 8 match the shape and size of the third groove 71 of the base 7. When the mold core 8 is inserted into the third groove 71, there is a gap between the mold core 8 and the third groove 71, so that the mold core 8 may freely enter and exit the third groove 71.

Figure 12:
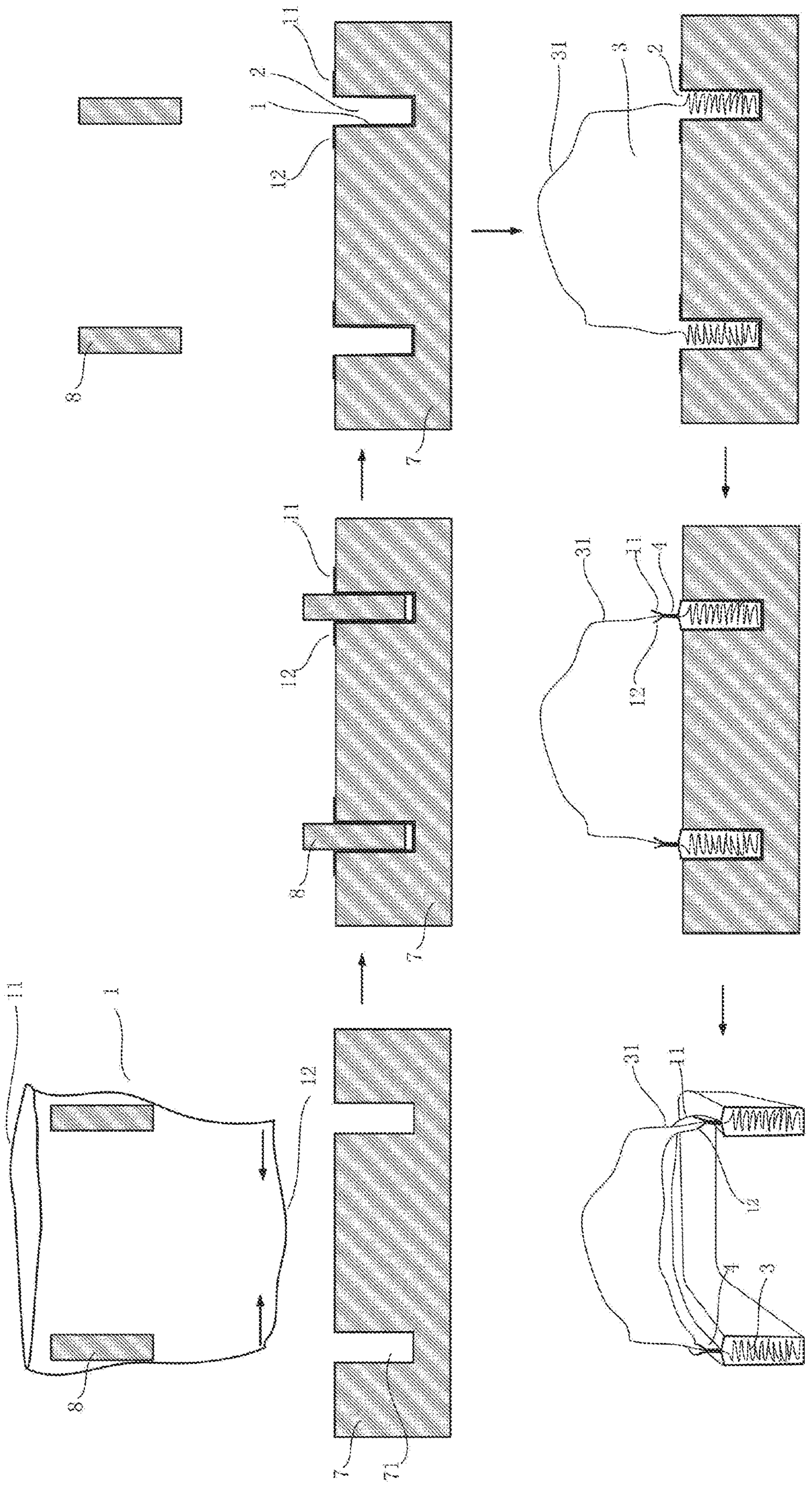
FIG. 12 is a schematic diagram of the use process of the packaging mold in FIG. 11.
Figure 13:
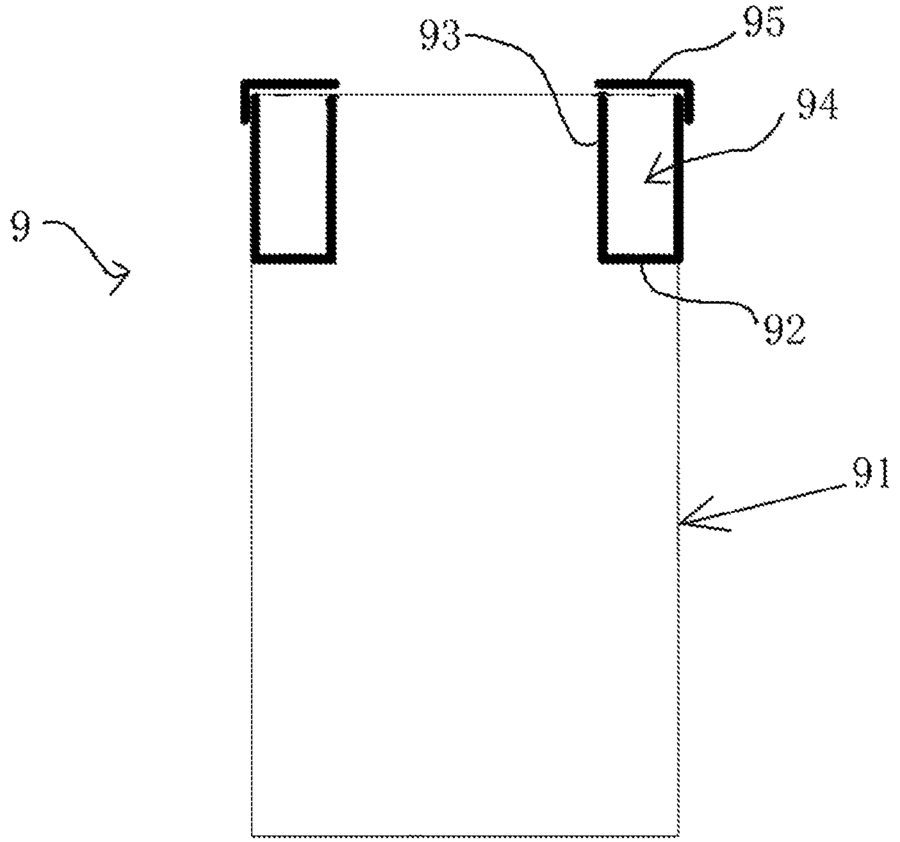

As shown in FIG. 12, the steps to use the packaging mold are as follows:

- step 1) taking a piece of the film tube material, opening and fixing the first opening of the film tube material via a core mold, closing and lifting the second opening of the film tube material, and the second opening is disposed inside or outside the first opening, thereby forming one first groove, and at this time, the core mold is located in the first groove;
- step 2) lowering and pressing the core mold 8 into the third groove 71, sucking the film tube material 1 into the third groove 71 via negative air pressure, the core mold 8 rises and exits the third groove 71, and one first groove 2 matching the shape and the size of the third groove 71 is formed on the plastic tube film 1;
- step 3) squeezing the long tube plastic film bag body 3 into the first groove 2, and leaving the end 31 of the long tube plastic film bag body 3 and making the end 31 of the long tube plastic film bag body 3 higher than the first opening 11 and the second opening 12 of the film tube material 1;
- step 4) connecting the first opening 11 of the film tube material 1, the long tube plastic film bag body 3, and the second opening 12 of the film tube material 1 in sequence to form the connecting line 4, thereby, the first groove 2 of the film barrel 1 is closed to form one annular space, the annular space is packaged with the long tube plastic film bag body 3 inside, and the end 31 of the long tube plastic film bag body 3 is extended out of the annular space;
- step 5) gathering and sealing the end 31 of the long tube plastic film bag body 3 to form the sealed end 32 into the first bag bottom of the long tube plastic film bag body 3.

In the invention, in order to mount the soft-packaged long tube plastic film bag in a garbage can 9, as shown in FIG. 5, FIG. 6, FIG. 8, and FIG. 13, the garbage can 9 includes a barrel body 91 and a second groove 94 for accommodating the long tube plastic film bag in the present embodiment, the second groove 94 is annular and has an open upper side, an inner sidewall 93 of the second groove 94 is annular and cylindrical and is fixedly connected or integrally formed with the barrel body 6, the annular cylindrical inner hole is the garbage input port, a bottom wall 92 of the second groove 94 is annular and is fixedly connected or integrally formed with the barrel body 91, the outer sidewall of the second groove 94 is annular and cylindrical and is fixedly connected or integrally formed with the barrel body 91; the long tube plastic film bag is stored in the second groove 94, and the sealed end of the long tube plastic film bag is exposed outside the second groove 94 and laid from the garbage input port into the inside of the barrel body 91 to form a storage space for storing garbage. In this way, in the present embodiment, the soft-packaged long tube plastic film bag may be limited in the second groove 94 to prevent the soft-packaged long tube plastic film bag from coming out of the garbage bag storage device during use. The barrel body 91 is also provided with a cover plate 95, the cover plate 95 is movably disposed above the second groove 94 and covers the upper opening of the second groove 94. This may avoid accidentally throwing garbage into the second groove 94, and also facilitates the replacement of the long tube plastic film bag. In order to make the pulling out of the long tube plastic film bag smoother, a passage is provided between the inner sidewall 93 and the cover plate 95 to facilitate the passage of long tube plastic film bags, and the passage may also be added by adding rollers at two sides of the channel to further ensure that the long tube plastic film bag may pass through the channel smoothly. Of course, in the invention, one storage box provided with a separate groove may also be fixed on the barrel body 91 via adhesive fixation, limit fixation, fastener fixation, etc., so that when the storage box is damaged, the garbage can may be used again by replacing the storage box.

In order to further facilitate the use of the soft-packaged long tube plastic film bag in the garbage can 9, as a preference, an easy-tearing line should be provided on the packaging container film tube material 1 of the soft-packaged long tube plastic film bag.

Figure 3:
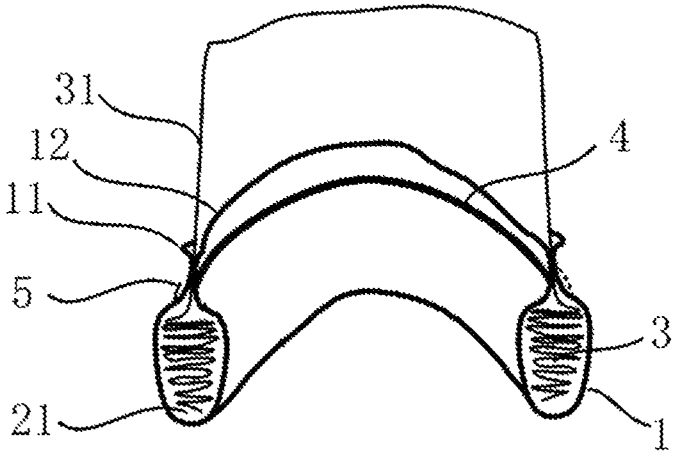
FIG. 3 is a schematic structural diagram of the long tube plastic film bag in Example 1.
Figure 4:
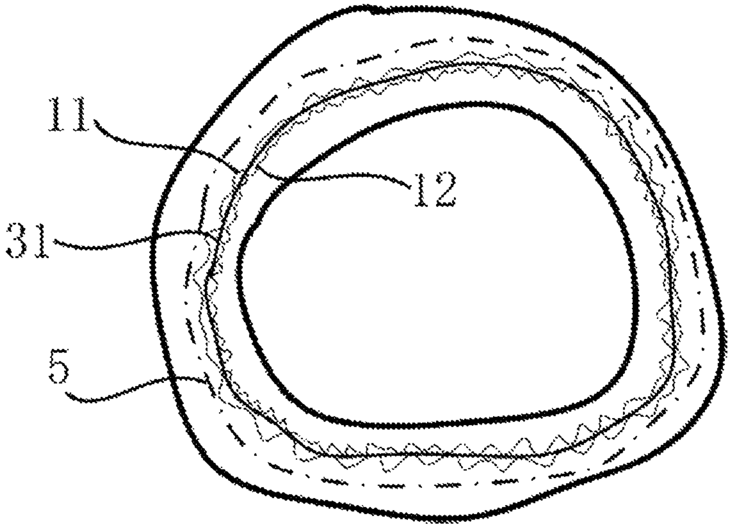
FIG. 4 is a schematic structural diagram of FIG. 3 from another angle.
Figure 5:
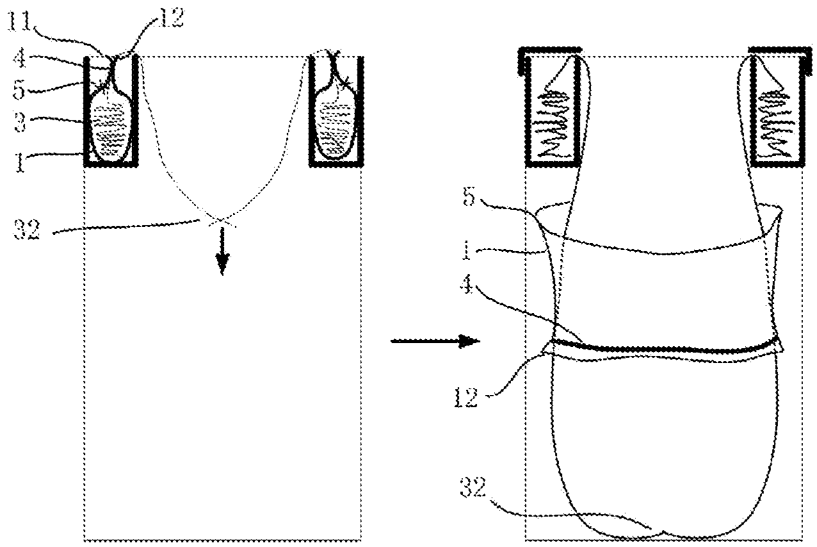
FIG. 5 is a schematic diagram of the use process of the long tube plastic film bag in Example 1.

In the present embodiment, as shown in FIG. 3 to FIG. 4, the connecting line 4 is in an annular shape and is formed by a hot melting or bonding method. The end 31 of the long tube plastic film bag body 3 is sealed to form the sealed end 32 of the long tube plastic film bag body 3. The sealed end 32 is the first bag bottom of the long tube plastic film bag body 3. In order to facilitate the use of the soft-packaged long tube plastic film bag, as shown in FIG. 3 and FIG. 4, a first easy-tearing line 5 is provided below the connecting line 4 at a side of the first opening 11 of the film tube material 1. As shown in FIG. 5, during use, the entire soft-packaged continuous long tube plastic film bag is stuffed into the second groove 94 of the garbage can 9, the first easy-tearing line 5 is torn off, and the cover plate 95 is closed. Then, via a manual or automatic method, the first bag bottom of the long tube plastic film bag body 3 is loaded into the garbage can 9, and the rest is the same as in Embodiment 1. In this way, when the entire film tube material 1 is pulled out from the second groove 94, it enters the garbage can together with the first bag bottom of the long tube plastic film bag body 3, and the bag entry resistance is greater.

Embodiment 2

Figure 6:
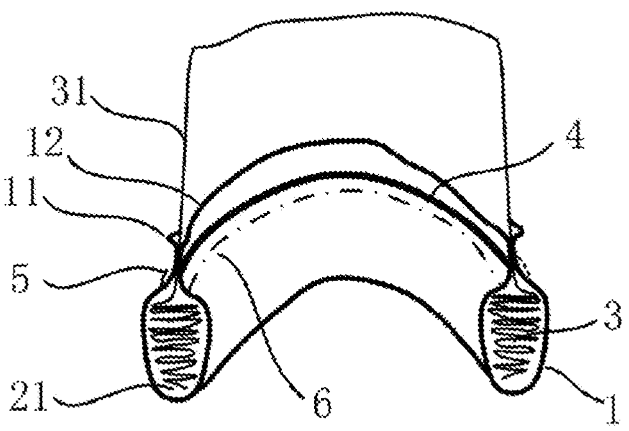
FIG. 6 is a schematic structural diagram of the long tube plastic film bag in Example 2.
Figure 7:
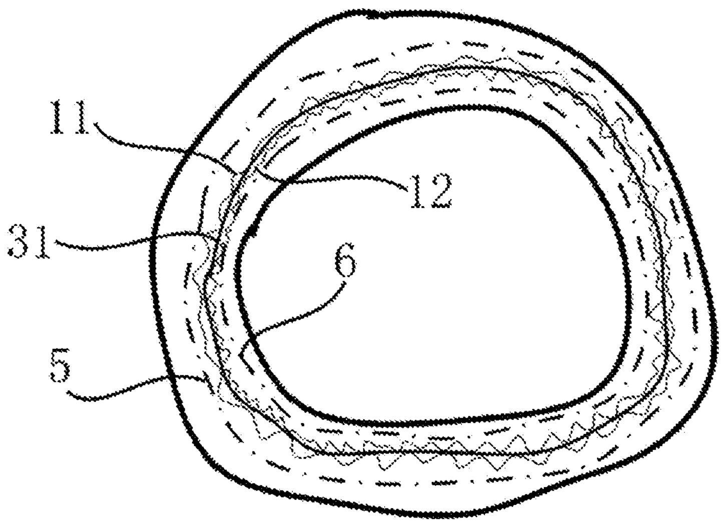
FIG. 7 is a schematic structural diagram of FIG. 6 from another angle.
Figure 8:
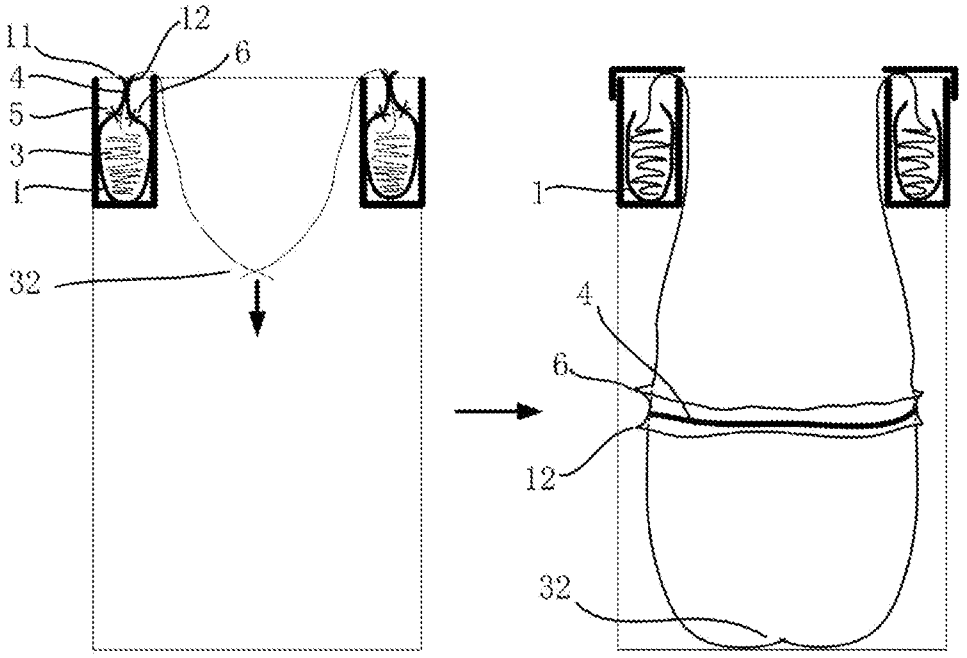
FIG. 8 is a schematic diagram of the use process of the long tube plastic film bag in Example 2.

As shown in FIG. 6 to FIG. 7, the connecting line 4 is in an annular shape and is formed by a hot melting or bonding method. The end 31 of the long tube plastic film bag body 3 is sealed to form the sealed end 32 of the long tube plastic film bag body 3. The sealed end 32 is the first bag bottom of the long tube plastic film bag body 3. In order to facilitate the use of the soft-packaged long tube plastic film bag, as shown in FIG. 6 and FIG. 7, a first easy-tearing line 5 is provided below the connecting line 4 at a side of the first opening 11 of the film tube material 1. A second easy-tearing line 6 is provided at a side of the second opening 12 of the film tube material 1 below the connecting line 4. As shown in FIG. 8, during use, the entire soft-packaged continuous long tube plastic film bag is stuffed into the second groove 94 of the garbage can 9, the first easy-tearing line 5 and the second easy-tearing line 6 are torn off, and the cover plate 95 is closed. Then, via a manual or automatic method, the first bag bottom of the long tube plastic film bag body 3 is loaded into the garbage can 9, and the rest is the same as in Embodiment 1. Under this method, the film tube material 1 and the long tube plastic film bag body 3 are separated, most of the film tube material 1 remains in the second groove 94, and only a small portion of the film tube material 1 near the connecting line 4 enters the garbage can 9 together with the long tube plastic film bag body 3. Compared with Embodiment 1, this bag entry method has smaller bag entry resistance.

Embodiment 3

The connecting line 4 is linear and is formed by a hot melting or bonding method. The connecting line 4 is the sealing end 32 and is also the first bag bottom of the long tube plastic film bag body 3. In order to facilitate the use of the soft-packaged long tube plastic film bag, the connecting line 4 is provided with a first easy-tearing line 5 below the side of the first opening 11 of the film tube material 1. The first opening 11 side of the film tube material 1 is provided with the first easy-tearing line 5 below the connecting line 4. During use, the entire soft-packaged continuous long tube plastic film bag is stuffed into the second groove 94 of the garbage can 9, the first easy-tearing line 5 is torn off, and the cover plate 95 is closed. Then, via a manual or automatic method, the first bag bottom of the long tube plastic film bag body 3 is loaded into the garbage can 9, and the rest is the same as in Embodiment 1. In this way, when the entire film tube material 1 is pulled out from the second groove 94, the film tube material 1 enters the garbage can together with the first bag bottom of the long tube plastic film bag body 3, and the bag entry resistance is greater. Compared with Embodiment 1, since the connecting wire 4 is linear, this method is simpler compared with the annular connecting wire and the hot melting or bonding method. Moreover, the connecting line 4 is the first bag bottom 32 of the long tube plastic film bag body 3, and the steps are simple and practicability is good.

Embodiment 4

The connecting line 4 is linear and is formed by a hot melting or bonding method. The connecting line 4 is the sealing end 32 and is also the first bag bottom of the long tube plastic film bag body 3. In order to facilitate the use of the soft-packaged long tube plastic film bag, the side of the first opening 11 of the film tube material 1 is provided with the first easy-tearing line 5 below the connecting line 4, and the side of the second opening 12 of the film tube material 1 is provided with the second easy-tearing line 6 below the connecting line 4. During use, the entire soft-packaged continuous long tube plastic film bag is stuffed into the second groove 94 of the garbage can 9, the first easy-tearing line 5 and the second easy-tearing line 6 are torn off, and the cover plate 95 is closed. Then, via a manual or automatic method, the first bag bottom of the long tube plastic film bag body 3 is loaded into the garbage can 9, and the rest is the same as in Embodiment 1. In this way, the film tube material 1 and the long tube plastic film bag body 3 are separated. Most of the film tube material 1 remains in the second groove 94, and only a small portion of the film tube material 1 near the connecting line 4 enters the garbage can 9 together with the long tube plastic film bag body 3. Compared with the bag entry method of Embodiment 1, since the connecting line 4 is linear, this bag entry method is simpler compared with the annular connecting line and the hot melting or bonding method. Moreover, the connecting line 4 is the first bag bottom 32 of the long tube plastic film bag body 3. The steps are simple, the practicability is good, and the bag entry resistance is less.

Embodiment 5

Figure 9:
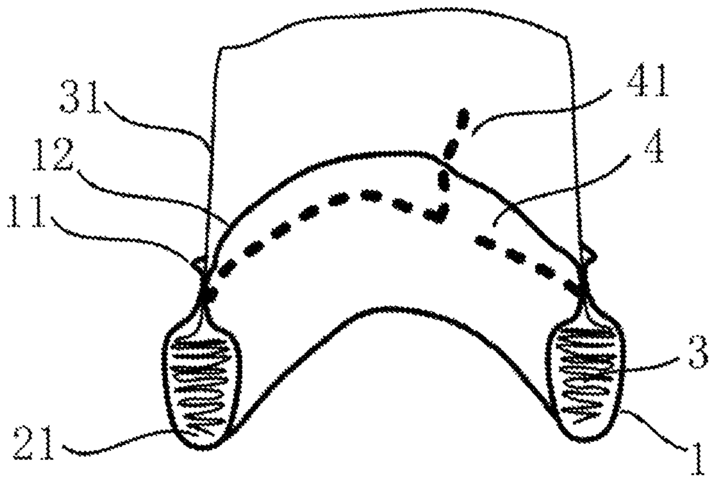
FIG. 9 is a schematic structural diagram of the long tube plastic film bag in Example 5.
Figure 10:
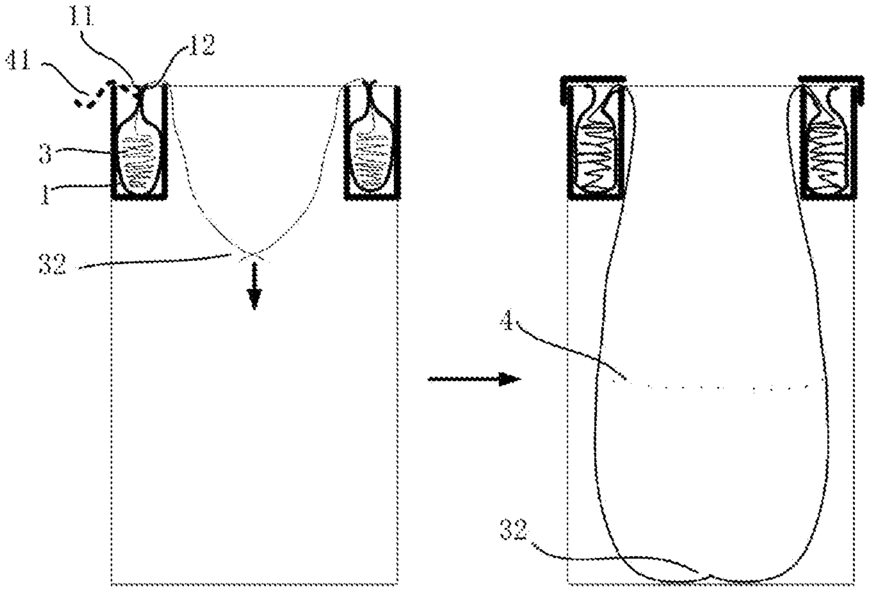
FIG. 10 is a schematic diagram of the use process of wrapping a long tube plastic film bag in Example 5.

As shown in FIG. 9, the connecting line 4 is in an annular shape and is formed by a sewing thread method, leaving a tail 41. The end 31 of the long tube plastic film bag body 3 is sealed to form the sealed end 32 of the long tube plastic film bag body 3. The sealed end 32 is the first bag bottom of the long tube plastic film bag body 3. During use, the user only needs to find the tail 41 of the sewing thread and cut the tail 41 off, and the entire sewing thread may be pulled off at one time with one pull. Therefore, in this way, there is no need to dispose an easy-tearing thread on the film tube material 1, and the rest is the same as Embodiment 1. As shown in FIG. 10, during use, the user inserts the entire soft-packaged continuous long tube plastic film bag into the second groove 94 of the garbage can 9, cuts the tail 41 of the sewing thread, and pulls off the sewing thread. At this time, the first opening 11 of the packaging plastic film tube material 1, the continuous long tube plastic film bag body 3, and the packaging plastic film tube material 1 and second opening 12 that are originally sewn together are separated. Then, the cover plate 95 is closed, and then the first bag bottom 32 of the long tube plastic film bag body 3 is put into the garbage can 9 via a manual or automatic method. In this way, the first bag has a row of small holes at the connection line 4. Therefore, the first bag may not hold liquid and has lower strength, but has no impact on the use of the subsequent long tube plastic film bag.

All features described in the specification, the appended claims, and the drawings, individually or in any combination thereof, are essential features of the invention.

In the description of the present specification, descriptions of reference terms such as "one embodiment", "some embodiments", "one implementation", "specific implementations", "other implementations", "examples", "specific examples", or "some examples" are intended that a specific feature, structure, material, or characteristic described in connection with the embodiment or example is included in at least one embodiment, implementation, or example of the invention. In this specification, schematic representations of the above terms do not necessarily refer to the same embodiment or example. Moreover, the specific features, structures, materials, or characteristics described above may also be combined in any suitable manner in any one or a plurality of embodiments, implementations, or examples. The technical solutions recited in the invention also include technical solutions in which any one or a plurality of the specific features, structures, materials, or characteristics described above are formed individually or in combination.

Although the embodiments of the invention have been shown and described above, it may be understood that the embodiments are illustrative and should not be construed as limitations of the invention. Those of ordinary skill in the art may change, modify, replace, vary, delete some features, add features, or recombine features within the scope of the invention without departing from the principles and purposes of the invention to form technical solutions. Any simple modifications, equivalent changes, and modifications made to the above embodiments according to the innovative principles of the invention still fall within the scope of the technical solutions of the invention.

What is claimed is:

1. A long tube plastic film bag, comprising a long tube plastic film bag body and an outer packaging packaged outside the long tube plastic film bag body, wherein the outer packaging is a film tube material, and the film tube material comprises a first opening and a second opening, the second opening is disposed inside the first opening, one annular first groove is formed between a sidewall of the first opening and a sidewall of the second opening, an end of the long tube plastic film bag body is an open end, another end of the long tube plastic film bag body is a sealed end, the long tube plastic film bag body is gathered toward the open end and stored in the first groove, the sealed end of the long tube plastic film bag body is extended out of the first groove of the film tube material, the first opening of the film tube material, the long tube plastic film bag body, and the second opening of the film tube material are fixedly connected via a connecting line, and the sealed end of the long tube plastic film bag body is a first bag bottom of the long tube plastic film bag body.

2. The long tube plastic film bag of claim 1, wherein a first easy-tearing line is provided at a side of the first opening of the film tube material below the connecting line.

3. The long tube plastic film bag of claim 2, wherein a second easy-tearing line is provided at a side of the second opening of the film tube material below the connecting line.

4. The long tube plastic film bag of claim 1, wherein the film tube material is a plastic film tube material or a paper film tube material.

5. The long tube plastic film bag of claim 1, wherein the connecting line is formed by hot melting, bonding, or sewing the first opening of the film tube material, the long tube plastic film bag body, and the second opening of the film tube material.

6. The long tube plastic film bag of claim 1, wherein the connecting line is in an annular shape or a linear shape.

7. A packaging method of the long tube plastic film bag of claim 1 having the specific packaging steps as follows:

step 1) taking a piece of the film tube material, opening and fixing the first opening of the film tube material, closing and lifting the second opening of the film tube material, and the second opening is disposed inside the first opening, thereby forming the first groove;

step 2) squeezing the long tube plastic film bag body into the first groove, and leaving a first end of the long tube plastic film bag body and making the first end of the long tube plastic film bag body higher than the first opening and the second opening of the film tube material;

step 3) connecting the first opening of the film tube material, the long tube plastic film bag body, and the second opening of the film tube material in sequence to form the connecting line, thereby, the first groove of the film tube material is closed to form one annular space, the annular space is packaged with the long tube plastic film bag body inside, and the first end of the long tube plastic film bag body is extended out of the annular space;

step 4) gathering and sealing the first end of the long tube plastic film bag body to form the sealed end into the first bag bottom of the long tube plastic film bag body.

8. The packaging method of the long tube plastic film bag of claim 7, wherein a packaging mold is further used, the packaging mold comprises a base and a core mold, the base is provided with a third annular groove, and a shape and a size of the core mold match a shape and a size of the third groove on the base; packaging steps using the packaging mold are as follows:

step 1) taking a piece of the film tube material, opening and fixing the first opening of the film tube material via the core mold, closing and lifting the second opening of the film tube material, thereby forming the first groove, and at this time, the core mold is located in the first groove;

step 2) lowering and pressing the core mold into the third groove, sucking the film tube material into the third groove via negative air pressure, the core mold rises and exits the third groove, and the first groove matching the shape and the size of the third groove is formed on the film tube material;

step 3) squeezing the long tube plastic film bag body into the first groove, and leaving the first end of the long tube plastic film bag body and making the first end of the long tube plastic film bag body higher than the first opening and the second opening of the film tube material;

step 4) connecting the first opening of the film tube material, the long tube plastic film bag body, and the second opening of the film tube material in sequence to form the connecting line, thereby, the first groove of the film tube material is closed to form one annular space, the annular space is packaged with the long tube plastic film bag body inside, and the first end of the long tube plastic film bag body is extended out of the annular space;

step 5) gathering and sealing the first end of the long tube plastic film bag body to form the sealed end into the first bag bottom of the long tube plastic film bag body.

9. A garbage can, comprising a barrel body, and further comprising a second groove used to accommodate the long tube plastic film bag of claim 1, wherein the second groove is annular and has an open upper side, an inner sidewall of the second groove is annular and cylindrical and fixedly connected or integrally formed with the barrel body, an annular cylindrical inner hole is a garbage input port, a bottom wall of the second groove is annular and fixedly connected or integrally formed with the barrel body, an outer sidewall of the second groove is annular and cylindrical and fixedly connected or integrally formed with the barrel body; the long tube plastic film bag is stored in the second groove, and the sealed end of the long tube plastic film bag is exposed outside the second groove and laid from the garbage input port into an inside of the barrel body to form a storage space for storing garbage.

10. The garbage can of claim 9, wherein the barrel body is further provided with a cover plate, the cover plate is movably disposed above the second groove and covers an upper opening of the second groove, and a channel is provided between the inner sidewall of the second groove and the cover plate to facilitate a passage of the long tube plastic film bag.

* * * * *